Feb. 13, 1973    MIYOSHI SUZUE    3,716,060
CONCAVE FOR TAKING OFF RACHIS BRANCH
IN THRESHING MACHINE FOR COMBINED
HARVESTER-THRESHERS

Filed July 1, 1971    2 Sheets-Sheet 1

United States Patent Office 3,716,060
Patented Feb. 13, 1973

3,716,060
CONCAVE FOR TAKING OFF RACHIS BRANCH IN THRESHING MACHINE FOR COMBINED HARVESTER-THRESHERS
Miyoshi Suzue, 1343-1 Higashizaki, Nankoku-shi, Kochi-ken, Japan
Filed July 1, 1971, Ser. No. 158,950
Int. Cl. A01f *12/24*
U.S. Cl. 130—27 K    3 Claims

ABSTRACT OF THE DISCLOSURE

This invention provides a concave for taking off rachis branch comprising the threshing blades and concave bars secured to the interior and exterior surface of the concave blank at each location between any two parallel rows of perforations provided in said concave blank, said threshing blades and said concave bars being opened to the direction opposite to the rotating direction of a threshing drum thereby to increase the threshing advantages.

---

This invention relates to an improvement in a concave for taking off rachis branch usually provided so as to cooperate with a threshing drum or cylinder of a combined harvester-thresher. More particularly, this invention relates to an improved concave which may be provided in the threshing cylinder-concave arrangement for the harvesting machines in which the cut heads of paddy or rice plant, wheat, oat, buckwheat or the like are subjected to the threshing and selecting operation, or for the paddy cleaners in which the threshed paddy is recleaned from the mixture of threshed paddy, unthreshed heads, paddy with rachis branch.

Crimped-wire sieves and iron plates with stamped-out perforations have been conventionally employed for the concave of the threshing machine. These prior concaves, however, have serious disadvantages wherein it is impossible to absolutely thresh paddy grains of the variety rather difficult to thresh, and further that it is quite difficult to separate the paddy grains from their rachis branches.

This invention is intended to eliminate the above disadvantages inherent to the prior concaves and has for its primary object to provide a novel concave by which the paddy variety rather difficult to thresh may be effectively threshed and thus the cleaned grains may be obtained with no rachis branch. In accordance with this invention, there is provided a novel concave for taking off rachis branch, which comprises a concave blank provided therein wtih a plurality of perforations in a uniformly or regularly spaced manner, threshing blades each extended longitudinally of the concave blank and secured to the interior surface of the concave blank at a location between any two adjacent parallel rows of said perforations, and concave bars each mounted on the exterior surface of the concave blank in opposition to the threshing blade, said threshing blades and concave bars being both arranged in such a manner as to open to the direction opposite to the rotating direction of a threshing drum.

With the concave for taking off rachis branch according to this invention being constructed as described above, the threshing of grains or seeds which are heavy in weight may take place at the threshing blades extending radially inwardly from the interior surface of the concave and, on the other hand, the threshing of unthreshed heads which pass outwardly through the perforations may take place at the threshing bars directed to the direction opposite to the rotating direction of the threshing drum, so that there may be now provided the concave that is high in threshing performance.

Another object of this invention is to provide a concave for taking off rachis branch, in which the threshing blades and concave bars are respectively secured on the interior and exterior surfaces of the concave blank by spot welding process, so that it is easy in fabrication as well as working.

Further object of this invention is to provide a concave in which the concave blank is subjected to partially-stamping operations to form integral tongue elements which are in turn folded outwardly, thereby providing the concave bars.

Another object of this invention is to provide a concave in which the perforated concave blank has mounted on the interior and exterior surfaces thereof metal strips such that these strips are each arranged between any two parallel and adjacent perforation rows, and then the strips are cut away at each portion between two adjacent perforations in the concave blank to thereby provide the threshing blades and concave bars.

Figure 5:
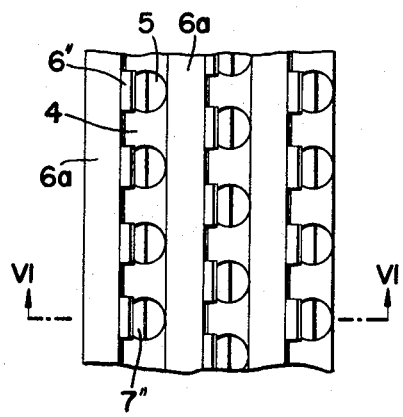
Figure 6:
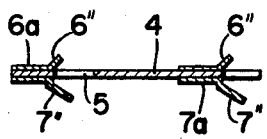

FIG. 5 is a fragmentary plan view showing another modification of the concave, in which a perforated concave blank has mounted thereon strips of substantially L-shaped profile such that the strips are each arranged between any two parallel and adjacent perforation rows, and then the strips are cut away at each portion between two adjacent perforations in the concave blank to thereby provide threshing blades and concave bars; and FIG. 6 is a sectional view taken along the line VI—VI of FIG. 5.

Referring now to the accompanying drawings, reference numeral 1 represents an opening through which the cut heads are fed into threshing chamber, 2 a threashing drum or cylinder which is provided on the periphery thereof with a plurality of threshing teeth 3 (in FIG. 6, there are illustrated only six pieces of threshing tooth), and is a concave for taking off rachis branch in co-operation with the threshing drum 2. The structure of the concave will be hereinafter described in detail with reference to FIGS. 2 to 6.

Figure 1:
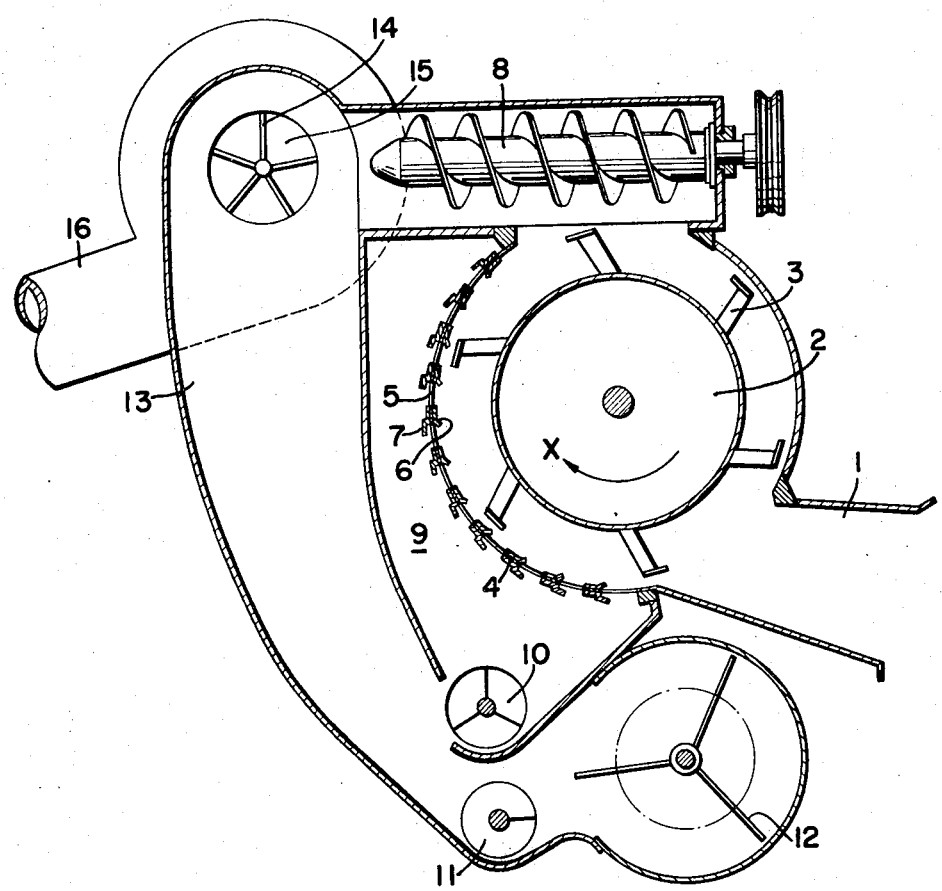
FIG. 1 is a schematic sectional view illustrating a threshing and selecting mechanism in a harvesting machine, in which a preferred embodiment of a concave according to this invention is assembled.
Figure 2:
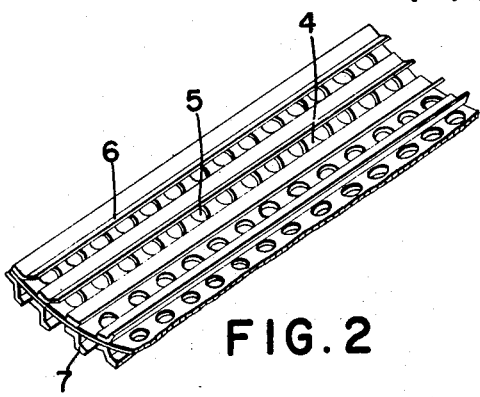
FIG. 2 is a perspective view showing a concave according to this invention.
Figure 3:
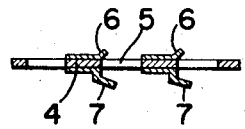
FIG. 3 is a fragmentary sectional view showing a concave having thereon secured threshing blades and concave bars.

Reference numeral 5 represents any one of perforations which are provided in the concave 4 in a uniformly or regularly spaced manner. Reference numeral 6 represents a threshing blade having a sectional profile as shown in FIG. 3. The threshing blades 6 are each extended longitudinally of the concave 4 and secured on the interior surface of the concave 4 at a location between any two adjacent parallel rows of the perforations 5.

Reference numeral 7, further, represents a concave bar having a cross-sectional profile as shown in FIG. 3. The concave bars 7 are each mounted on the exterior surface of the concave 4 in opposition to the threshing blades 6. The threshing blades 6 and concave bars 7 are both arranged in such a manner as to open to the direction opposite to the rotating direction X of the threshing drum 2. Reference numeral 8 represents an auger-type conveyor where straw stalks which could not fall through the concave perforations are transported to a discharge blower 14, 9 a spacing chamber, 10 a rotor for moving the mixture of threshed grain, unthreshed heads, chaff and other small debris, 11 a grain auger-type conveyor, 13 a grain separating chamber, 15 an intake port for the discharge blower 14, and 16 a chaff-discharge port.

Operation of the threshing mechanism constructed according to this invention will be now explained.

The cut head thrown into the threshing chamber through the opening 1 may revolve around the threshing drum 2 with a high speed (for example, 1300 r.p.m.) under the action of the threshing teeth 3. Thus, the grains which are heavy in weight make movement outwardly by centrifugal force and run against the threshing blades 6 which are projectingly provided on the interior surface of the concave, with the result that the threshing takes place. The threshed grains or seeds move through the perforations 5 and over the concave bars 7 to the spacing chamber 9 and further descend onto the rotor 10 where the grains or seeds are conveyed to the grain separating chamber 13. In this separating chamber 13, the ascending current of air is normally provided by the combined action of the fan 12 and the discharge blower 14 so that the chaff and dust are discharged out of the chaff-discharge port 16 through the blower 14 by means of the ascending current in the grain separating chamber. Whereas, the grains or seeds which are heavy in weight fall down through the grain separating chamber 13 onto the clean-grain auger-type conveyor 11 where they are moved to a grain tank (not shown).

The technical advantages of this invention is now explained in comparison with the prior techniques. In the prior technique where the crimped-wire sieve or iron plate with stamped-out perforations is arranged around the threshing drum and, therefore, there is provided no concave bar, it is difficult to completely thresh out the grains of the crop variety rather difficult to thresh. Accordingly, much unthreshed grains or seeds (so called "unthreshed heads") fall down through the concave to the spacing chamber and move through the grain separating chamber to the grain tank so that the mixture in this grain tank is adversely rich in the unthreshed grains. This may result in a non-uniform drying effect by the grain dryer. Further, this will prove a serious hindrance to the husking operation by the huller. On the contrary with such prior technique, in accordance with this invention, the grains or seeds on the heads may separately come into collision with the threshing blades on the interior surface of the concave and thus be effectively threshed out from the rachis branches by the action of the knife edged threshing blades. On the other hand, the unthreshed heads which may move outwardly through the concave perforations 5 by the centrifugal force are checked at the concave bars 7 which are directed to the direction opposite to the rotating direction of the threshing drum 2, so that the grains are completely threshed out from their rachis branches at the concave bars and then fed to the spacing chamber 9. It will be thus understood that this invention has the great advantage of obtaining the clean grains which may be directly fed to the grain dryer or huller without being recleaned.

Figure 4:
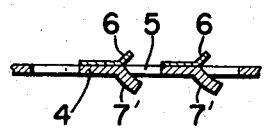
FIG. 4 is a view similar to FIG. 3, but showing a modification wherein tongue-shaped concave bars are provided by partially stamping out the concave itself.

Referring now to FIG. 4, there is shown an embodiment of this invention. The concave blank 4 is not completely punched out, but partially cut to provide the integral tongues which are then folded outwardly thereby to provide the concave bars 7' and the concave perforations 5. The threshing blades 6 are secured on the interior surface of the concave blank 4 as in the case shown in FIG. 3. According to this embodiment shown in FIG. 4, the concave bars 7' may be fabricated from the concave blank 4 itself, so that it is improved in economy as compared with the embodiment described with reference to FIG. 3.

FIGS. 5 and 6, further illustrate a further modified embodiment of this invention, in which the perforated concave blank 4 has mounted on the interior and exterior surfaces thereof the metal strips 6a and 7a, respectively, such that these strips 6a and 7a are each arranged between any two adjacent perforations 5 rows, provided mutually with each other. Thus, heads passed between two adjacent perforations come into collision with the threshing blades 6'' and the concave bars 7'' of the latter row thereby to threshing heads.

The concave blank, the threshing blades and concave bars employed in this invention is preferably made of stainless steel or steel and the concave blank and concave bars are about 0.6 to 0.8 mm. in thickness and the threshing blades are about 0.8–1.0 mm. in thickness. Preferably, the concave perforation has the diameter of about 9 mm.

The following is to compare the combined harvester-thresher which has the concave according to this invention with the prior combined harvester-thresher.

VARIETY OF PADDY CROP ("ASAKAZE" IN JAPANESE)

|  | This invention | | Prior art | |
| --- | --- | --- | --- | --- |
|  | Grams | Percent | Grams | Percent |
| Fine grain | 120.40 | 96.552 | 71.85 | 91.5 |
| Ratio of husked and broken grain | 0.10 | 0.80 | 1.20 | 1.530 |
| Unthreshed heads (two or more grains with rachis branch) | 1.15 | 0.922 | 1.65 | 2.100 |
| Grains with rachis branch | 2.90 | 2.326 | 2.75 | 3.510 |
| Chaffs | 0.15 | 0.120 | 1.00 | 1.270 |
| Total weight | 124.70 | 100.000 | 78.45 | 100.000 |

Now assuming that the data of this invention be the numeral 1, the following results may be determined from the above table:

| | | |
| --- | --- | --- |
| Fine grains | 1:0.95 | This invention is superior in yield. |
| Ratio of husked grain and broken grain. | 1:1.9 | It is remarkably reduced in this invention. |
| Unthreshed heads (two or more grains with rachis branch). | 1:2.3 | It is extremely reduced in his invention. |
| Grains with rachis branch. | 1:1.5 | Do. |
| Chaffs | 1:10.6 | It is remarkably reduced in this invention. |

From the foregoing, it will be understood that the combined harvester-thresher according to this invention is less in pods, grains with rachis branch and chaffs and, on the other hand, superior in threshing and cleaning performances as compared with the prior combines. Thus, the clean grains obtained in the combines according to this invention has no requirement of grain-recleaning operation. Further advantage of this invention resides in that the hulled grain ratio and seed damage are remarkably reduced so that the harvesting has no adverse influence in the quality of paddy or rice grains.

What is claimed is:

1. In a thresher concave for use with a thresher having a threshing drum for threshing grains from stocks or heads, including concave bars mounted thereon and extending substantially parallel to the axis of rotation of the threshing drum, and a series of adjacent perforations forming passages which are arranged between and facing said concave bars, said passages being sized to admit at least a portion of said stocks or heads, the improvement comprising:

inner portions of said concave bars being disposed along the inner surface of said concave and having formed thereon bent extensions projecting towards said threshing drum adapted to effect a major portion of the threshing action; and said concave bars having outer portions disposed along the outer surface of said concave and having formed thereon bent extensions facing the outlet ends of said perforations and projecting outwardly of said threshing drum at an angle opposite to the direction of rotation of said drum for completing the threshing action by temporarily trapping the unthreshed remainder of said stocks or heads.

2. A thresher concave as claimed in claim 1, said outer portions of said concave bars and said perforations being formed by stamped-out portions of said thresher concave so as to provide integral tongues having outwardly bent segments defining said outwardly projecting extensions; and said inner portions being each secured to the inner surface of said concave so as to extend longitudinally thereof at locations intermediate any two adjacent and parallel rows of said perforations.

3. A thresher concave as claimed in claim 1, said inner and outer portions of said concave bars being each formed by bent metal strips, secured to respectively the inner and outer surfaces thereof intermediate any two adjacent and parallel rows of said perforations.

References Cited

UNITED STATES PATENTS

| 1,342,806 | 6/1920 | Gross | 130—27 J |
| 3,191,606 | 6/1965 | Suzue | 130—27 R |

FOREIGN PATENTS

| 354,188 | 6/1922 | Germany | 130—27 J |
| 146,228 | 4/1952 | Australia | 130—27 J |

ANTONIO F. GUIDA, Primary Examiner